Jan. 16, 1940. A. RAVA Re. 21,326

METHOD AND MEANS FOR INDUCTIVELY HEATING THE METALLIC PARTS OF ENCLOSED ELECTRICAL DEVICES

Original Filed May 29, 1924

Alexander Rava INVENTOR.

BY Charles J. Holland ATTORNEY.

Reissued Jan. 16, 1940 Re. 21,326

UNITED STATES PATENT OFFICE 21,326

METHOD AND MEANS FOR INDUCTIVELY HEATING THE METALLIC PARTS OF ENCLOSED ELECTRICAL DEVICES

Alexander Rava, Chicago, Ill.

Original No. 1,676,049, dated July 3, 1928, Serial No. 716,632, May 29, 1924. Application for reissue February 2, 1934, Serial No. 709,517

17 Claims. (Cl. 250—27.5)

Figure 1:
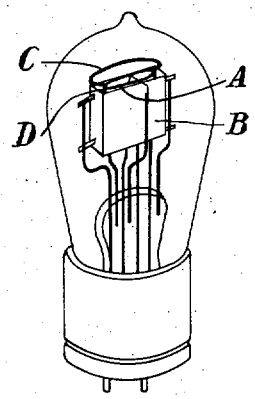

The present invention relates to methods of inductively heating the metal parts inclosed within the bulb or envelope of an electrical device and to means for effectuating such inductive heating.

It has been proposed frequently to vaporize metallic and other getters for the purpose of cleaning up the residual gases within the bulb where, as, for example, in a radio vacuum tube, a high vacuum is desirable and it is immaterial whether or not the glass walls remain transparent. This indeed is the common practice at the present day in the manufacture of high vacuum devices that depend on electronic discharge. It has also been proposed to introduce a gas filling within the bulbs of rectifiers, detectors of certain types and other devices of like nature. Again gases that react with oxygen have been introduced into devices that are provided with electrodes or other metal parts within the bulb either in a vacuum or in an atmosphere of gas, for the purpose of preventing the oxidization of the metallic parts. It has also been suggested that a nitrogen atmosphere may be created within the envelope or bulb, as in a gas filled incandescent lamp, by vaporizing nitrogen bearing compounds, as, for example, phosphorous nitride, after sealing of the bulb. It is also a frequent practice in the radio vacuum tube art to heat the electrodes to drive out the occluded gases from the metal during exhaustion of the bulb.

There has never been suggested, however, any entirely satisfactory method of vaporizing these substances or heating the electrodes at a desired time. In the case of radio vacuum tubes magnesium for example is commonly vaporized within the envelope by bombardment while the tube is being exhausted or, by inductive heating while the tube is still on the pumps. The heating of the metal parts, either inductively or by bombardment is primarily for the purpose of driving out the occluded gases. In neither instance is it possible to control the time at which the vaporization shall take place as it occurs whenever the temperature of the metal parts has been raised to the vaporization point of the material that is desired to be volatilized. This vaporization point is generally a low temperature yet the getter should not be vaporized until the occluded gases have been driven out of the metal parts, an operation that requires a very much higher temperature.

It is the object of the present invention to provide a method and means for inductive heating of the metal parts of electrical devices inclosed in an envelope, whereby the occluded gases are driven off from the metal parts by one heating, and vaporizable material, such as metallic getters for example, or other gas producing materials, will be volatilized by another.

In accordance with my invention, I make use of the principle embodied in Faraday's law. The high frequency magnetic flux employed in inductive heating is produced generally by a cylindrical coil, through which a strong current of several hundred kilocycles is passed. The direction of the main flux in the space surrounded by the coil and in the immediate external proximity thereto is parallel to the geometrical axis of the coil. If, now, a closed flat conducting contour or loop is placed in the path of the flux so that the plane of the contour or loop is perpendicular to the direction of the flux, a powerful electromotive force is induced in the loop. This electromotive force is directly proportionate to the size of the surface inclosed by the contour of the loop. If, however, the contour is parallel to the flux the induced electromotive force will be negligible.

In accordance with my invention, I weld upon the metal part which is to be heated, a loop of conductive material in such position as may be desired to carry out the objects of this invention.

This loop may present a completely inclosed contour in itself, or it may be so attached to a metal part, as, for example, the grid of a radio vacuum tube, that the inclosed contour will be formed partly by the loop and partly by the coil of the grid to which it is attached.

Figure 2:
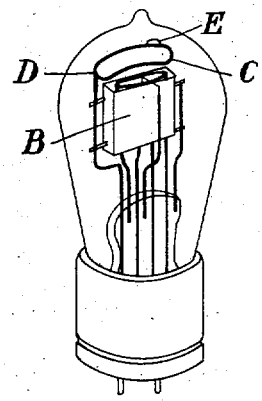
Figure 3:
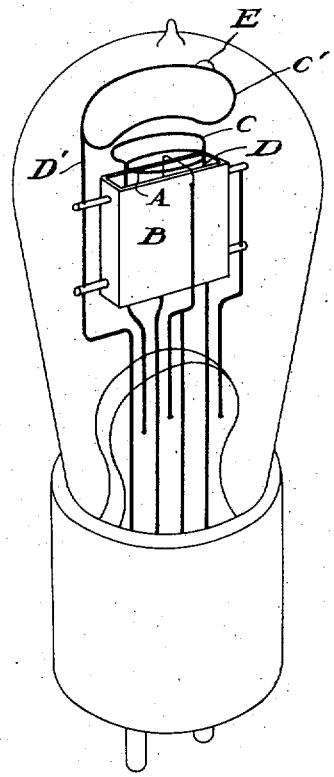

The accompanying drawing shows the use of my invention to one particular form of apparatus to which it is applicable, namely, a radio vacuum tube. Figure 1 shows the method of using it for the purpose of driving out the occluded gases from the grid of the tube. Figure 2 shows the application of the invention when it is desired to use it for the purpose of vaporizing a getter or producing a gas atmosphere within the envelope of an electrical device. Fig. 3 shows a tube having its electrodes provided with two loops arranged angularly with respect to each other.

Referring now to the the drawing in which the same letters indicate similar parts of the device it will be observed that I have shown a well known type of radio vacuum tube in which the grid, A, is of elliptical coil construction. The plate electrode, B, is also of the equally familiar box construction. I have found by actual experiment that such a structure presents considerable obstacles to the degasification of the electrodes by inductive heating. It has been found in fact that when vacuum tubes having a grid and filament electrodes enclosed within a plate electrode have been inductively heated to remove the gases therefrom, they differ widely in their behavior, showing in general a low electronic emission and poor amplifying properties. This is particularly so when they are used as high frequency amplifiers. I have discovered that these defects are due to an insufficient degasification of the grid electrode, the bars and supports of which, being shielded by the surrounding plate, cannot be degasified properly by the present method of inductive heating. It is also particularly the case that in the present methods of inductive heating, the getter is volatilized too soon and if the heating is continued after such volatilization more gases are driven out of the metal parts which can no longer be counteracted by the getter and such gases therefore remain free within the bulb unless the exhaust pumps succeed in removing them.

By Faraday's law, the loop formed as above described when its plane is perpendicular to the direction of the magnetic flux from the high frequency coil, will cause a thorough heating of the part to which it is attached. In Figure 1 it will be observed that the loop, C, is mounted on the supports D′ and D″ which may be extensions of the grid supports. The shape of the loop, however, is such that it extends outward from these supports over the plate the contour of which it in part follows but from which it is insulated. The plane of this loop is parallel to the plane of the lateral section of the plate. The loop so mounted does not present in itself a closed contour since it is open at one side. The half of the coils of the grid at the open side of the loop, however, complete the contour so that the same is effectively closed. When the high frequency coil is brought down over the bulb of such a tube the magnetic flux induces a current in the plate which will bring it to a high heat in the same manner as is usual in the processes of such heating as well known at the present time. But it will also induce a current in the grid which will produce a similar heating of that electrode. If the loop were absent, this result would be prevented by the shielding effect of the plate. The loop, however, overcomes this shielding effect by reason of the fact that the high frequency coil induces a current in the grid by reason of the fact that the grid itself forms part of the closed contour of the loop. The current is, therefore, set up with equal effect in the grid and the plate simultaneously, and the result is an equal heating and degasification of both.

In Figure 2 it will be observed that the loop, instead of being mounted in a plane parallel to the plane of the lateral section of the plate, is mounted in a plane which is perpendicular thereto. This loop forms in itself a closed contour and is welded to the plate B at the point D. Upon the loop so mounted a small piece of metallic getter, or other material that it is desired to vaporize, may be attached to loop C at E. When the high frequency coil is applied over the bulb in a tube to which the loop has been mounted in this position the electrodes become heated while the loop itself remains comparatively cool and far below the vaporization point of the attached material, and the electrodes are thus degasified while the metallic getter remains unvolatilized. Now, the degasification of the electrodes being completed, the high frequency coil may be removed and presented to the tube a second time in such a direction that the plane of the loop, C, is perpendicular to the direction of the flux of the coil and in this case the loop becomes heated while the electrodes remain comparatively cool. The result then is the volatilization of the getter at a time when it is possible for it to react with all the gases driven out of the electrodes.

It will be evident that one or more loops may be attached to the metal parts of such electrical devices, the loops being set at various angles to the plane of the lateral section of the part to which it is attached as shown in Fig. 3. In this form of the invention one loop C is mounted upon the grid electrode supports D, similar to the arrangement shown in Fig. 1, and a second loop C′ is mounted upon the plate electrode support D′ such that the plane of loop C′ is disposed at an angle to the plane of loop C. By arranging the loops C and C′ in this manner they are individually susceptible to magnetic fields of different directions. Preferably the loop C′ carries a globule E of vaporizable material to be used as a "getter".

Having thus described my invention what I claim is:

1. The method of removing gas from a conductive body inclosed within an envelope wherein said body is shielded by another conductive body from a magnetic field which consists in affixing to said first mentioned body a loop of conductive material forming a closed contour with said body and being insulated from other conductive bodies within said envelope heating said loop and said conductive body by a high frequency magnetic field to remove the gas therefrom, removing said gas from said envelope and sealing said envelope.

2. The method of degasifying conductive bodies shielded by other conductive bodies within an envelope which consists in attaching a loop of conductive material to the body to be degasified in such manner that the loop and said body combine to form a closed contour, said loop being insulated from the other conductive bodies within said envelope, heating said loop and the body to be degasified by the action of a high frequency magnetic field, the magnetic flux of which is perpendicular to the plane of said loop, and cuts the loop beyond the shielding influence of the other conductive bodies removing the gases from said conductive body by such heating, removing such gases from the envelope and sealing said envelope.

3. The method of degasifying the grid electrodes of radio vacuum tubes, having a plurality of inclosed electrodes including a grid inclosed within a plate electrode, all inclosed within an envelope, which consists in attaching to the grid supports a loop so shaped as to extend outward following in part the contour of the edge of the plate and forming with the portions of the grid opposite said loop a closed contour, heating said loop and said grid by a high frequency magnetic field to remove the gas therefrom, removing said gas from said envelope, and sealing said envelope.

4. The method of preparing electrical discharge devices having conductive bodies inclosed within an envelope which consists in affixing to one of said conductive bodies a loop having a closed contour lying in a plane transverse to the axis of said conductive body and attaching to said loop a vaporizable substance, then heating the conductive bodies by a high frequency magnetic field to remove the gas therefrom while said loop remains relatively cool, afterwards heating said loop by a high frequency magnetic field to the vaporization point of the substance attached thereto while the said conductive body remains relatively cool, removing the gases from said envelope and sealing said envelope.

5. The method of preparing radio vacuum tubes having a plurality of electrodes inclosed within an envelope, some of which electrodes are shielded from the action of a magnetic field by other electrodes, which consists in attaching to one of said shielded electrodes a loop of conductive material which forms with the combination of the part to which it is attached a closed contour, heating said loop and said shielded electrode by a high frequency magnetic field to drive out the occluded gases from said shielded electrode, removing said gases from said envelope and sealing said envelope.

6. The method of improving the vacuum within the envelope of an electrical discharge device having conductive bodies inclosed within said envelope which consists in attaching to one of said electrodes a loop of conductive material in a plane perpendicular to the plane of a lateral section of said electrodes and affixing to said loop a getter, heating said electrodes by means of a high frequency magnetic field to drive out the occluded gases from said electrodes while the loop remains at a temperature below the vaporization temperature of the getter, then heating the loop by a high frequency magnetic field to the vaporization point of said getter while the electrodes are at a temperature below said vaporization point, removing the residual gases from the envelope and sealing said envelope.

7. The method of preparing electrical discharge devices having electrodes inclosed within an envelope which consists in attaching a vaporizable substance to a loop which is affixed to one of the electrodes by inductive heating, driving out from the electrodes the occluded gases then vaporizing said vaporizable substances by inductive heating, removing the residual gases from said envelope and sealing said envelope.

8. The method of preparing electrical discharge devices having electrodes inclosed within an envelope which consists in attaching a vaporizable substance to a loop which is affixed to one of the electrodes, then by the action of a high frequency magnetic field, driving out from the electrodes the occluded gases and vaporizing the said vaporizable substances at different times, removing residual gases from said envelope and sealing said envelope.

9. In an electrical discharge device having conductive bodies sealed within an envelope, one of said conductive bodies being shielded from the influence of a magnetic flux by another of said conductive bodies, an exposed loop having an effectively closed contour attached to said shielded conductive body which is desired to be heated inductively.

10. In an electrical discharge device having conductive bodies sealed within an envelope, one of said conductive bodies being shielded from the influence of a magnetic flux by another of said conductive bodies, an exposed loop of conductive material attached to said shielded conductive body which is desired to be heated inductively, said loop forming in combination with the part to which it is attached a closed contour.

11. In an electrical discharge device having conductive bodies sealed within an envelope a loop of conductive material having a closed contour to which is affixed a substance to be vaporized, said loop being in a plane parallel to the axis of said conductive bodies.

12. In a radio vacuum tube having a filament and grid inclosed within a plate electrode, all of said electrodes being inclosed within an envelope, a loop of conductive material having a closed contour attached to the grid supports, said loop lying in a plane perpendicular to the axis of said grid.

13. In a radio vacuum tube having a filament and grid inclosed within a plate, all of said electrodes being inclosed within an envelope, and said grid being shielded by the plate from the influence of a magnetic flux, an exposed loop of conductive material attached to the grid supports and forming with one side of the grid a closed contour.

14. In an electrical discharge device having electrodes inclosed within an envelope, one of the electrodes being shielded by another electrode from the influence of a magnetic flux, an exposed loop of conductive material attached to said shielded electrode and forming with said electrode a closed contour susceptible to the influence of a magnetic flux of a given direction, and a second loop of conductive material attached to one of the electrodes and exposed at an angle to said first mentioned loop, said second mentioned loop having a closed contour and being disposed so as to be susceptible to the influence of a second magnetic flux disposed at an angle to the first mentioned flux.

15. The method of preparing electrical discharge devices having electrically conductive bodies comprising electrodes disposed within an exhausted envelope, which consists in first so directing an intense high frequency magnetic field from without said envelope that the entire mass of each of said electrodes is heated chiefly by high frequency currents induced in each of said electrodes by said high frequency magnetic field to such elevated temperature and for a sufficient time, so as to expel substantially all removable gases therefrom, discontinuing such heating of said electrodes to permit them to cool, and thereafter without any concurrent appreciable reheating of any of said previously heated electrodes so directing a differently disposed intense high frequency magnetic field from without said envelope as to inductively so heat an electrically conductive getter support, which support is of miniature mass in comparison to the mass of said electrodes and was previously properly positioned in said envelope close to but spaced apart from any of said electrodes, to such elevated temperature and for a sufficient time, but without concurrent appreciable additional degasification of said electrodes, so as to vaporize a getter disposed in good thermal conducting contact with said support, removing the residual gas from said envelope, and sealing said envelope.

16. The method of preparing electrical discharge devices having electrically conductive bodies comprising electrodes disposed within an exhausted envelope, which consists in so directing a high frequency magnetic field from a coil disposed exteriorly of said envelope to inductively heat said electrodes for a sufficient time and to such an elevated temperature, as to remove substantially all gases therefrom chiefly directly by said inductive heating, then discontinuing such heating of said electrodes and permitting them to cool, and thereafter, and without any appreciable reheating of said electrodes, directing a differently disposed high frequency magnetic field from a coil also exteriorly located in respect to said envelope as to independently inductively heat a getter previously disposed within said envelope prior to the initial exhausting of said envelope in a position close to but spaced apart from any of said electrodes, for a sufficient time and to such elevated temperature as to vaporize said getter, said getter being of relatively miniature mass as compared to the aggregate mass of said electrodes, the heating of said electrodes and of said getter being independent from each other, the heating of said electrodes being effected while said getter is cool, and the heating of said getter being accomplished while said electrodes continue to remain cool, removing the residual gas from said envelope, and sealing said envelope.

17. The method of preparing electrical discharge devices having metal parts enclosed within an envelope, which consists in directing a high frequency electric current in a circuitous path so disposed as to embrace said envelope and thereby electromagnetically induce heating currents in said metal parts within said envelope which are embraced within said path to remove the gases from said thereby heated parts chiefly by the direct effect of said inductive heating, then permitting said heated parts to cool, and later, without appreciably reheating said parts, vaporizing a getter affixed to another metal part previously also enclosed within said envelope in a position close to but spaced apart from any of said first named metal parts, which getter bearing part is of negligibly small mass compared to the mass of said first named metal parts, by directing high frequency electrical currents through a circuitous path, which path is disposed differently from said first mentioned path disposition, in order to set up a high frequency magnetic field to cause said field to induce electromagnetically heating electric currents in said getter bearing part to vaporize said getter while said first named metal parts remain cool, thus effecting independent sequential selective inductive heating of said first heated parts and of said getter both by high frequency currents directed in different circuitous paths disposed without said envelope, removing the residual gas from said envelope, and sealing said envelope.

ALEXANDER RAVA.